US006724890B1

United States Patent
Bareis

(10) Patent No.: US 6,724,890 B1
(45) Date of Patent: Apr. 20, 2004

(54) ADAPTIVE TRANSMISSION LINE IMPEDANCE MATCHING DEVICE AND METHOD

(75) Inventor: Bernard F. Bareis, Plano, TX (US)

(73) Assignee: Premisenet Incorporated, Richardson, TX (US)

(*) Notice: Subject to any disclaimer, the term of this patent is extended or adjusted under 35 U.S.C. 154(b) by 0 days.

(21) Appl. No.: 09/198,782

(22) Filed: Nov. 24, 1998

(51) Int. Cl.[7] .................................................. H04M 1/00
(52) U.S. Cl. ........................................ 379/394; 379/403
(58) Field of Search ................................. 379/394, 398, 379/400, 403, 404, 30, 1.04, 22.02, 27.03; 375/257

(56) References Cited

U.S. PATENT DOCUMENTS 4,799,066 A * 1/1989 Deacon ........................ 343/861
5,459,440 A * 10/1995 Claridge et al. ............ 333/17.3
5,771,262 A * 6/1998 Benayoun et al. .......... 375/257
6,192,109 B1 * 2/2001 Amrany et al. ............... 379/30

* cited by examiner

Primary Examiner—Minsun Oh Harvey
Assistant Examiner—Jefferey Harold
(74) Attorney, Agent, or Firm—Baker Botts L.L.P.

(57) ABSTRACT

An adaptive transmission line impedance matching device and method are disclosed. The device and method can be used, for example, in xDSL and home phone line network applications. The adaptive impedance matching device comprises a signal transmission section, a signal receiving section, a variable impedance matching network and a signal analysis section. The signal receiving section is operable to receive signal information transmitted across a transmission line. The signal analysis section is then operable to calculate a proper impedance match based upon the signal information and to adjust the variable impedance matching network according to the calculated impedance match. The device and method are robust enough, for example, to account for dynamic mismatches when telephone sets are taken off-hook during digital (e.g., xDSL) network operation.

41 Claims, 13 Drawing Sheets

ADAPTIVE TRANSMISSION LINE IMPEDANCE MATCHING DEVICE AND METHOD

TECHNICAL FIELD OF THE INVENTION

This invention relates in general to the field of network communication systems, to an adaptive transmission line impedance matching device and method and, more particularly, to such a device and method for xDSL and home phone line network applications.

BACKGROUND OF THE INVENTION

Twisted pair telephone lines to customer premises, until recently, typically only carried voice or modulated audio in the 200 Hz to 3.4 kHz band. Therefore, optimization of the lines for transmission of signal energy primarily concerned this frequency band. A variety of techniques were developed by the telephone industry to distribute fixed value loading coils over lengths of telephone cable in order to maintain a reasonable efficiency level for the transmission line in the voice frequency band.

With the rapid evolution of digital subscriber lines (xDSL) and broadband modulation techniques in the telecommunications industry, fixed loads for high frequency impedance matching inside the broadband modem equipment have been used in place of distributed loading coil techniques. It has been generally assumed that digital signal processing algorithms used in the broadband modem equipment alone are sufficient to recover a usable amount of signal. Such is not always the case, particularly when considering lines that are many times the length of the wavelength of the frequency or frequencies being propagated.

The problem encountered is that if the signal or a portion of the signal in a given frequency spectrum is attenuated too much at the modem receiver, then it can not be recovered. High frequency receivers have a finite input dynamic range, and, once the signal falls close to or below the ambient noise level on the line, it becomes unusable. To resolve this problem, the signal reflections and attenuation due to mismatches in the transmission medium need to be significantly reduced using a well matched termination impedance or preferably a well matched transmitter impedance and termination impedance in combination with the transmission line.

Using a fixed impedance match, as is sometimes done conventionally, does increase the efficiency some. However, a problem with using a fixed impedance in the transmitter interface and/or receiver interface is that it provides only a "compromise" matching impedance. Although more efficient than using no impedance matching network, there will still be a significant amount of loss of various portions of the frequency spectrum of the signal when traversing long distances over a transmission line.

Numerous problems exist in the real world that make it difficult or impossible to have even a good impedance match with a fixed load for a large range of conditions. For example, temperature variation can dynamically cause the length of several miles of environmentally exposed transmission line to change enough to dramatically adversely affect the signal being propagated.

Installing like telecommunications equipment in various countries throughout the world also makes it impossible to have a single fixed load to match all base-band impedance specifications for each country. Impedance matching devices to compensate for base-band voice or audio frequency variations from county to country, for example, are the subject of U.S. Pat. No. 5,802,169. This patent describes the implementation of a means capable of providing twisted pair line impedance matching at base-band voice or audio frequencies by selecting any of a number of predetermined value "compromise" networks specific to each country. U.S. Pat. No. 5,771,262 describes an impedance matching means to account for impedance differences in various countries and covers base-band voice or audio frequencies and AMI coded digital lines inclusive of T1, E1, and ISDN.

Having unknown types of cables in a network is yet another issue. An apparatus providing a solution for such impedance matching is presented in U.S. Pat. No. 5,459,440. The system described in this patent provides real time impedance matching in order to alleviate the need for test equipment, but does give consideration to the significant loading changes found in the high frequency spectrum when base-band frequency telephone sets are randomly taken off-hook. Along with coaxial cables, the system described addresses use of twisted pair cables, but does not cover combined use of telephone and data equipment, such as local area network or the like on the same cable or twisted pair.

U.S. Pat. No. 5,459,440, like other conventional art, does not address the subject of impedance matching simultaneously for multiple frequency ranges over a broad spectrum. Performing impedance matching at high frequencies with subscriber line interface circuitry and telephone set loads being randomly attached to the twisted pair line provides a much more complex environment in which to solve the problem of automated or adaptive impedance matching.

SUMMARY OF THE INVENTION

In accordance with the present invention, an adaptive transmission line impedance matching device and method are disclosed that provide advantages over prior network communication systems.

According to the present invention, the adaptive transmission line impedance matching device and method can be used, for example, in xDSL and home phone line network applications. The adaptive impedance matching device comprises a signal transmission section, a signal receiving section, a variable impedance matching network and a signal analysis section. The signal receiving section is operable to receive signal information transmitted across a transmission line. The signal analysis section is then operable to calculate a proper impedance match based upon the signal information and to adjust the variable impedance matching network according to the calculated impedance match. The device and method are robust enough, for example, to account for dynamic mismatches when telephone sets are taken off-hook during digital (e.g., xDSL) network operation.

It is a technical advantage of the present invention to provide a unique adaptive impedance matching device to interface one or more pieces of equipment to a twisted pair telephone line, network cable, or the like. The present invention is additionally capable of separately matching a plurality of equipment segregated by operating frequency. The adaptive impedance matching device may, for example, be a single device matching the line for one or more pieces of connected equipment or the device may be separated and integrated into each piece of equipment.

It is also a technical advantage of the present invention to ensure that matching adverse impedance variations in one or more portions of the spectrum of signals transmitted on the line does not affect non-problematic portions of the spectrum.

It is another technical advantage of the present invention to continually measure the variation between the transmitted and the received signals in each portion of the frequency spectrum so as to automatically adapt the termination impedances or termination and source impedances in each respective portion of the spectrum to the attached transmission line.

It is yet another technical advantage of the present invention to use as a reference the signal or signals originated by one or more transmitters covering a wide frequency range or a plurality of segregated frequency ranges. The reference signal or signals are used to determine the characteristic impedance value as seen by the transmitter or transmitters and are additionally used to determine the appropriate load impedance value to be used by terminating circuitry in corresponding frequency bands.

A further technical advantage of the present invention is to use an adaptive means to automatically adjust the source and termination impedances of the transmission line so that optimum impedances are attained at all times. An additional benefit of automatic adjustment is that equipment users are not required to make any manual adjustments.

Additional technical advantages of the present invention should be apparent from the specification, drawings and claims.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Figure 1:
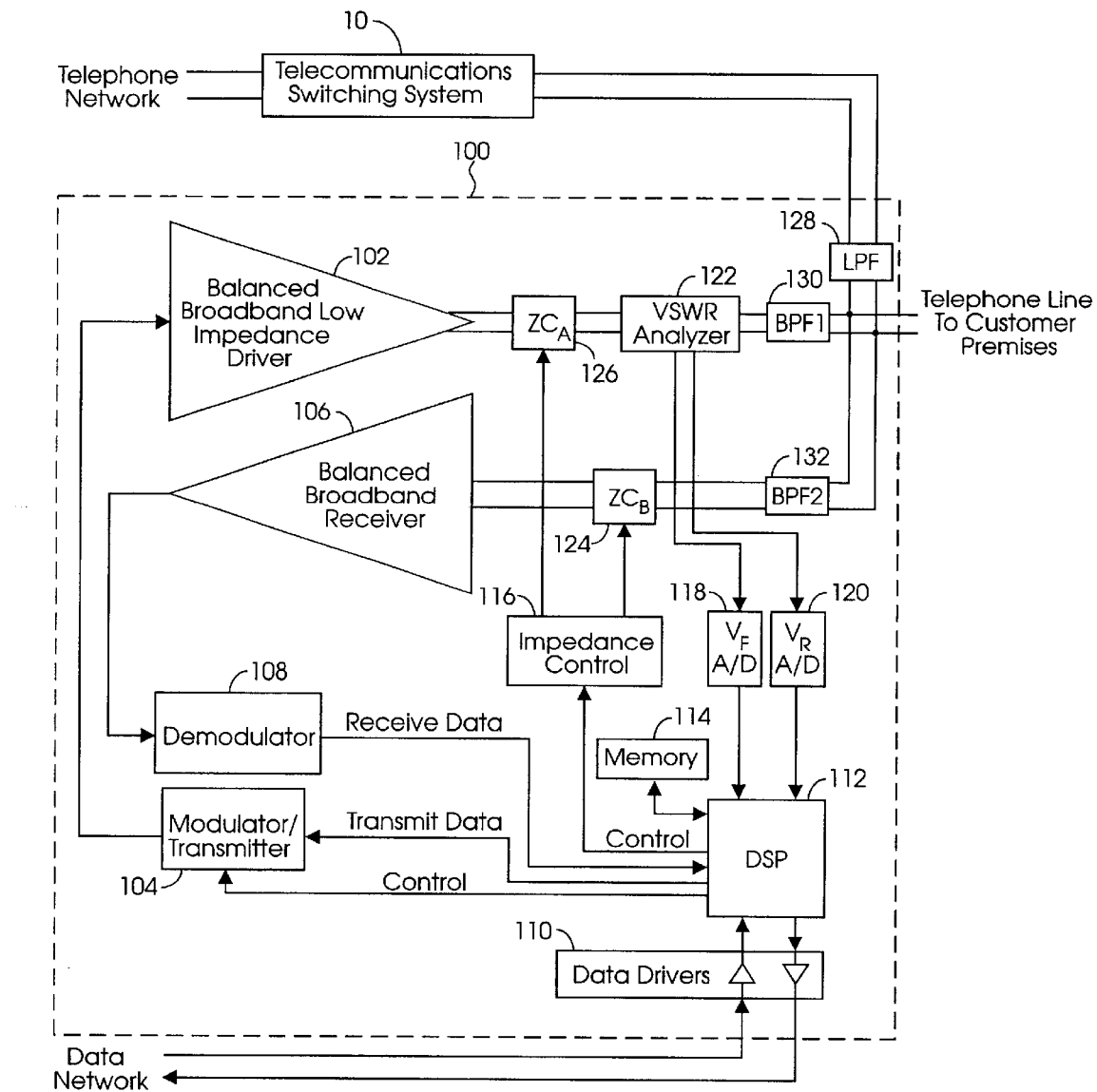
FIG. 1 is a diagram illustrating a portion of a first embodiment of an adaptive impedance matching device located at the telephone company central office.

In order to alleviate problems with transmissions across telephone lines, it can be important to properly match impedances of equipment connected to twisted pair telephone lines carrying modem signal transmissions, especially high frequency transmissions such as those implemented by a variety of digital subscriber line (xDSL) modems and high speed premises modems. Adaptive or adjustable impedance matching has not previously been implemented in such communication systems.

The problematic case of impedance matching, as described in the following embodiments, pertains generally to xDSL and customer premises broadband modem equipment when telephone sets, facsimile equipment, or the like that are attached to the line are taken off-hook for voice-band telephone calls. The off-hook telephone sets, for example significantly change the telephone line loading and termination impedance at high frequencies. Because voice-band telephone calls can occur at any time and because multiple telephone sets may be taken off-hook simultaneously, it is not typically possible to effectively match the transmission line using a fixed termination impedance network. Rather, the high frequency broadband impedance matching network or networks should be adaptive and should work in conjunction with existing telephone equipment on the line as well as combinations of xDSL and home premises network equipment. In addition, the adaptive impedance matching network should be capable of being automatically configured such as to operate properly for a wide range of network topologies.

In such networks, in order to achieve the highest possible information or data rate, the impedance of the load and transmitter should be continually optimized to match the impedance of the transmission line. Accordingly, a device can be provided to periodically or continually assess the signal transmission efficiency and to dynamically adjust and optimize the termination impedance or a combination of source and termination impedances based on the results thereof. In this case, the efficiency of the transmission line can be kept at its peak and the information or data rate can be kept correspondingly high, regardless of load changes or reasonable environmental effects on the transmission line.

As described in the following embodiments, the disadvantages and inefficiencies associated with existing broadband modem equipment and the like are overcome by providing a device capable of continuously analyzing line transmission efficiency using, for example, the results of VSWR (voltage standing wave ratio) analysis to dynamically configure the transmission line load impedance or combined source and load impedances such that high transmission line efficiency is maintained. Instead of using a fixed impedance matching circuit, the device implements dynamic adaptive impedance matching circuits that are continuously tuned in order to provide a near optimal match at all times.

The present adaptive impedance matching device and method are designed to automatically adapt and match impedance circuitry on an existing twisted-pair telephone line for, but not limited to, high frequencies used for xDSL, home phone line premises networks, and the like. Additionally, the impedance matching circuitry can be used to match combinations of base-band voice/audio equipment, home phone line networking equipment, xDSL equipment, and other equipment on the line segregated by operating frequency range.

As described more fully below, according to one embodiment of the present invention, an adaptive impedance matching device comprises an electronic circuit having a signal transmission section, a signal receiving section, a signal analysis section, and a feedback mechanism to control and configure an included set of variable impedance matching networks. The signal analysis section may either be in the form of discrete electronic components organized in a design specifically for providing control of the variable impedance matching networks or it may be in the form of an interface circuit and a software algorithm residing on one or more control processing devices such as a digital signal processor (DSP) or the like, which, in turn, controls the variable impedance matching networks.

This embodiment of the device could be located inside broadband modem equipment such as xDSL modems, home phone line network modems, or the like. During normal operation, the transmitting or source modem analysis section provides VSWR information to the signal analysis section of the receiving modem across the transmission line. The signal analysis section of the receiving modem then calculates a proper impedance match and adjusts the variable impedance matching network comprising the load accordingly. In the case where the signal analysis section incorporates a DSP, the signal analysis section can comprise an interface circuit combined with a software algorithm operating in conjunction with application software on a single DSP integrated circuit where the single system DSP provides application signal processing and control for the modem as well as signal analysis and control for the variable impedance matching networks.

According to an alternate embodiment of the present invention, a modem signal is transmitted using a predefined frequency spectrum at a predefined power level. Because the signal originates at a predefined level and is transmitted with a predefined frequency spectrum, an analysis of the physical effects on the signal that has traversed the transmission line can be made. The results of this analysis can then be used by the signal analysis section of the receiving modem to calculate an optimized impedance match and adjust the variable impedance matching network or networks comprising the load accordingly.

It will be appreciated in the following description that operation of an adaptive termination device of the present invention is shown by way of example in an ADSL environment. It is likewise understood that the present invention is useful for similar broadband environments including, but not limited to, RADSL, VDSL, HDSL, SDSL, and home phone line networks with certain enhanced features as will be described.

Figure 2:
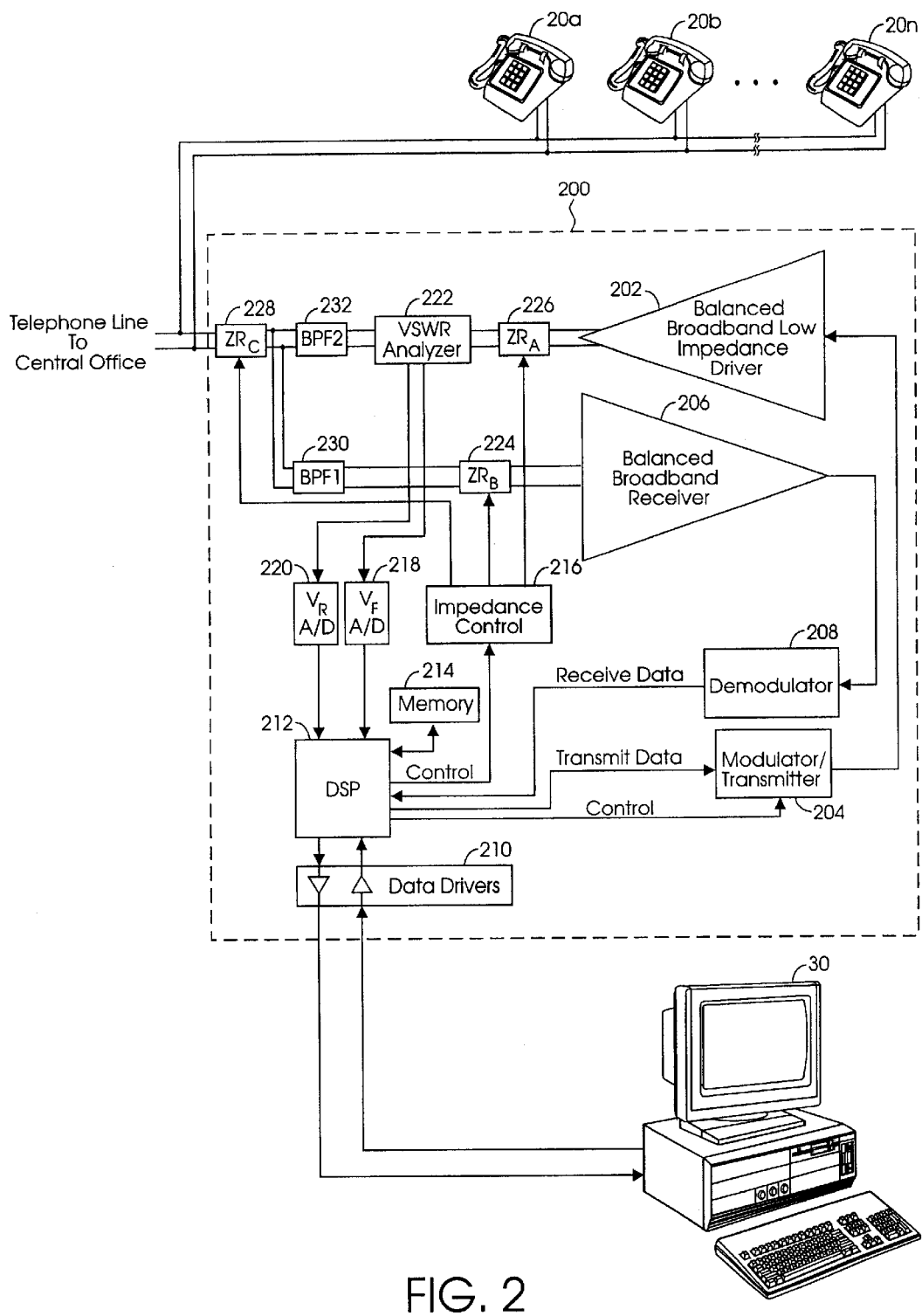
FIG. 2 is a diagram illustrating another portion of the first embodiment of an adaptive impedance matching device located at the customer premises.

FIG. 1 is a diagram illustrating a portion of a first embodiment of an adaptive impedance matching device located at the telephone company central office, and FIG. 2 is a diagram illustrating another portion of the adaptive impedance matching device located at the customer premises. As shown, the adaptive impedance matching device includes a transmit and receive section located at each end of a transmission line. One end of the transmission line is terminated at the distribution office, such as a telecommunications central office, and the other end of the transmission line is located at or in the customer premises. For simplicity and to make clear the operation of the present invention, pertinent components have been shown. Somewhat extraneous components, such as level matching stages, amplifiers, power supplies, and the like, have been excluded from these drawings.

As shown, the section detailed in FIG. 1 adds a VSWR analyzer 122, two A/D converters 118 and 120, an impedance control circuit 116, and two adaptive impedance matching networks 124 and 126 to typical central office ADSL modem components. These typical components are represented by a DSP 112, high speed memory 114, data drivers 110, a modulator and transmitter 104, a balanced broadband low impedance driver 102, a balanced broadband receiver 106, a demodulator 108, and a low pass filter 128. Also, signal processing software is added to the DSP high speed memory 114 for adaptive impedance matching.

As shown in FIG. 2, the customer premises section similarly can add a VSWR analyzer 222, two A/D converters 218 and 220, an impedance control circuit 216, a transmitter series adaptive impedance matching network 226, a receiver adaptive impedance matching network 224, and a bulk impedance matching network 228 to typical customer premises ADSL modem components. Similar to FIG. 1, these typical components are represented by a DSP 212, high speed memory 214, data drivers 210, a modulator and transmitter 204, a balanced broadband low impedance driver 202, a balanced broadband receiver 206, and a demodulator 208.

To begin operation, the respective modem device 100 or 200 proceeds through an initialization period. During initialization, the central office modem 100 and customer premises modem 200 set impedance networks to "compromise" values and establish a communications link on an operational portion of the frequency spectrum. As long as a physical interconnection exists between the central office and the customer premises modems, a data path can be established in a minimum of a portion of the available frequency spectrum.

During operation, the central office side modulator/transmitter 104 and driver 102 send a broadband set of signals to the balanced broadband receiver 206 covering the spectrum or plurality of frequency ranges to be used. The broadband set of signals may be applied simultaneously, sequentially, or in any other way in which to cover the frequency range or ranges being analyzed and can be performed intrusively or non-intrusively with respect to data being sent or received via the transmission line. When the analysis cycle is complete, the modem has covered the entire frequency spectrum or plurality of frequency ranges to be used.

During the analysis of each signal from the central office, the VSWR analyzer 122 provides voltage level from both the forward and reflected signals to respective A/D converters 118 and 120. Alternatively, the VSWR analyzer 122 could provide both voltage level and phase information from both the forward and reflected signals to respective A/D converters 118 and 120. A/D converters 118 and 120 then transfer a corresponding digital representation to DSP 112. The digital representations are then stored in high speed memory 114 in order for appropriate impedance values for the adaptive impedance matching network 226 ($ZR_A$), network 224 ($ZR_B$) and network 228 ($ZR_C$) of FIG. 2 to be calculated. The need to change the termination impedance values can be determined by the equation:

$$S=(V_F+V_R)/(V_F-V_R)$$

In this equation, S is the voltage standing wave ratio, VSWR, of the forward and reflected signals, $V_F$ and $V_R$ respectively. In the case where the termination impedance is matched, the magnitude of $V_R$ will approach zero, and S will approach one. In the case where the termination is unmatched, the magnitude of $V_R$ will approach $V_F$ as the transmitted energy is reflected accordingly. In this case, S will be greater than one. If S is not sufficiently close to one, as determined by the requirements of the application, then optimization of the termination matching network may be required.

To optimize the termination matching network, $V_F$ and $V_R$ information is transmitted to the customer premises modem DSP 212 where impedance correction values are calculated and applied to impedance matching network 224 ($ZR_B$) and network 228 ($ZR_C$). $V_F$ and $V_R$ information from the transmitting modem is sent via the transmission line, preferably in a data packet. Alternatively, the impedance correction values could be calculated in the DSP 112 of the central office modem 100 and transmitted to the receiving modem 200 and DSP 212 for application to impedance matching network 224 ($ZR_B$) and network 228 ($ZR_C$).

The operation of the adaptive impedance matching device in the direction from the customer premises to the central office performs similarly to that which has just been described for operation in the direction from the central office to the customer premises. A set of broadband signals are sent from the modulator/transmitter 204 of the customer premise modem 200. A proportionate amount of the transmitted signal is reflected corresponding to the impedance mismatch of the terminating load at the central office end of the transmission line. VSWR analyzer 222 of the customer premise modem 200 then sends $V_F$ and $V_R$ information to the respective A/D converters 218 and 220. The A/D converters 218 and 220 transmit a digital representation of the $V_F$ and $V_R$ information to DSP 212. The information is, in turn, stored in high speed memory 214 and then transmitted, preferably in a data packet, through modulator/transmitter 204 to balanced broadband low impedance driver 202. The signal then passes through network 226 ($ZR_A$), VSWR analyzer 222, band pass filter 232 (BPF2), network 228 ($ZR_C$), and over the telephone line to reach receiver 106, demodulator 108 and DSP 112 of the central office modem 100. DSP 112 uses the received $V_F$ and $V_R$ information from customer premises modem 200 to adjust adaptive impedance network 124 ($ZC_B$) in order to optimize the termination impedance.

Alternatively, the impedance correction values could be calculated in the DSP 212 of the customer premises modem 200 and transmitted to the receiving modem 100 and DSP 112 for application to impedance matching network 124 ($ZC_B$).

It should be noted that in the above descriptions, the ADSL information for transmission between the customer premises and central office is separated by frequency. One frequency band is used to transfer data from the central office modem 100 to the customer premises modem 200. This frequency band is the pass band for filters 130 (BPF1) of central office modem 100 of FIG. 1 and filters 230 (BPF1) of customer premises modem 200 of FIG. 2. Another frequency band is used to transfer data from the customer premises to the central office and is the pass band for filter 232 (BPF2) of the modem 200 of FIG. 2 and for filter 132 (BPF2) of the modem 100 of FIG. 1. The pass band filters 130 and 230 (BPF1) and filters 132 and 232 (BPF2) keep signals from each frequency band from interfering with measurements from VSWR analyzers 122 and 222. Additionally, the band pass filters 130 and 230 (BPF1) and 132 and 232 (BPF2) keep adjustments of adaptive impedance matching networks in each frequency band from significantly affecting one another.

Figure 3:
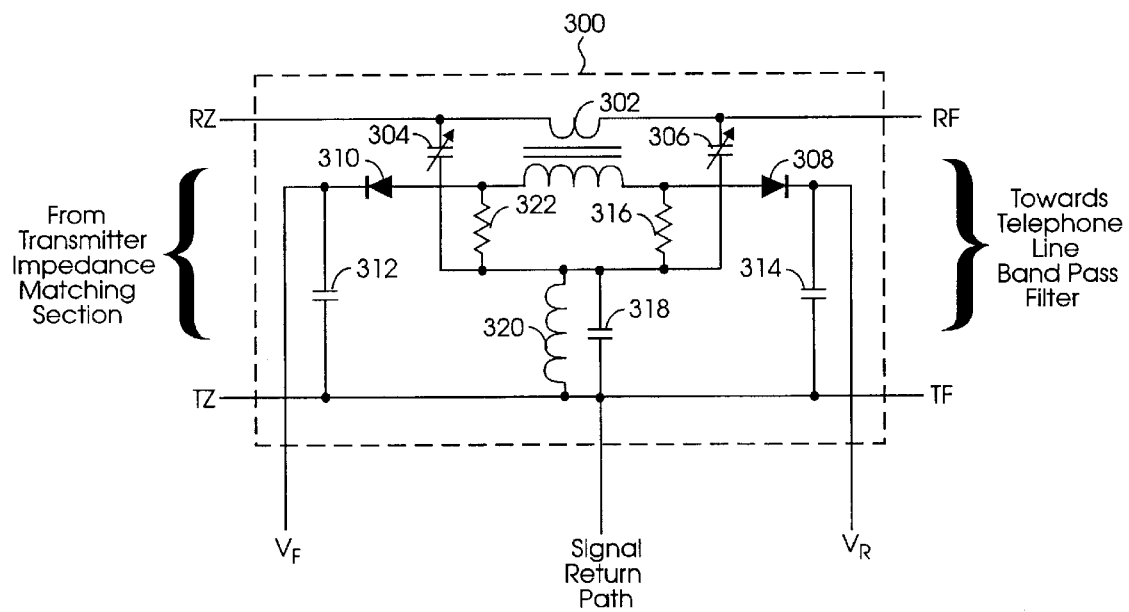
FIG. 3 is a detailed component diagram of one embodiment of the VSWR analyzer of the adaptive impedance matching devices of FIG. 1 and FIG. 2.

FIG. 3 is a detailed component diagram of one embodiment of the VSWR analyzer of the adaptive impedance matching devices of FIG. 1 and FIG. 2. FIG. 3 should provide a further understanding of the VSWR analyzer 122 of the central office modem 100 and of the VSWR analyzer 222 of the customer premise modem 200. As shown, the VSWR analyzer 300 is comprised of a bridge circuit which separates the transmitted, or forward, voltage from the reflected voltage on the transmission line connected to terminals TF and RF through a band pass filter. The signal to be transmitted is injected at terminals TZ and RZ. The forward voltage, $V_F$, level comes from wide band current transformer 302, is rectified by diode 310 and is filtered by capacitor 312. The forward voltage, $V_F$, is then passed in reference to the signal return path to a voltage amplifier and then to the corresponding $V_F$ A/D converter for digital signal processing analysis.

The reverse voltage, $V_R$, level comes from wide band current transformer 302, is rectified by diode 308 and is filtered by capacitor 314. The reverse voltage, $V_R$, is then passed in reference to the signal return path to a voltage amplifier and then to the corresponding $V_R$ A/D converter for digital signal processing analysis.

Capacitors 304 and 306 are variable trim capacitors used to align the bridge circuit to ensure valid forward and reverse voltage measurements. The capacitors 304 and 306 are adjusted and set at the time of manufacturing and are not designed to be changed during normal operation. Resistor 322 and resistor 316 make up balanced branches of the bridge circuit and are equal in value. Inductor 320 and capacitor 318 are broadband filter components for the bridge circuit.

Figure 4:
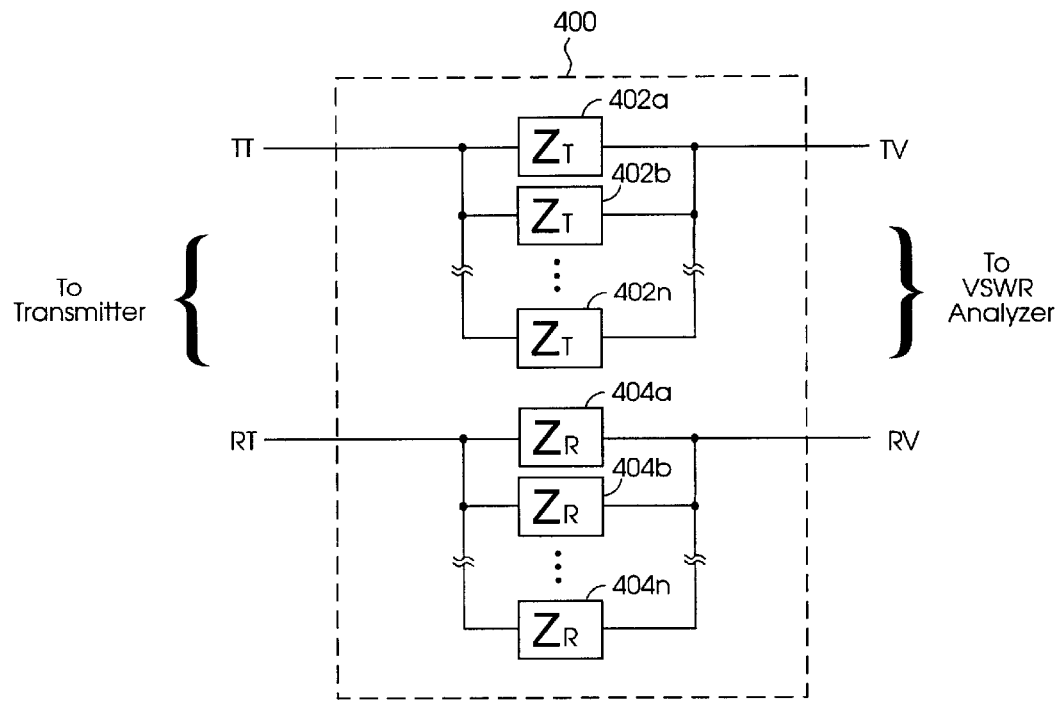
FIG. 4 is a detailed diagram of one embodiment of the transmitter section of the adaptive impedance matching device of FIG. 1 and FIG. 2.

FIG. 4 is a detailed diagram of one embodiment of the transmitter section of the adaptive impedance matching device of FIG. 1 and FIG. 2. As shown, FIG. 4 illustrates an exemplary series adaptive impedance matching network representative of network 126 ($ZC_A$) of FIG. 1 and network 226 ($ZR_A$) of FIG. 2. During modem operation, sections 402a–402n of $Z_T$ and sections 404a–404n $Z_R$ are switched in and out based on the local VSWR analyzer values of $V_F$ and $V_R$. Terminals TT and TR are connected to the respective modem transmitter and are the input nodes to the series adaptive impedance matching network 400. Terminals TV and TR are the output nodes.

Sections 402a–402n of $Z_T$ and sections 404a–404n of $Z_R$ are complimentary and are switched in and out in unison to provide a balanced adaptive impedance match. Each section is associated with a separate operating frequency band that is a subset of the entire band of coverage of the plurality of impedance matching sections 402a–402n of $Z_T$ and 404a–404n of $Z_R$.

Figure 5:
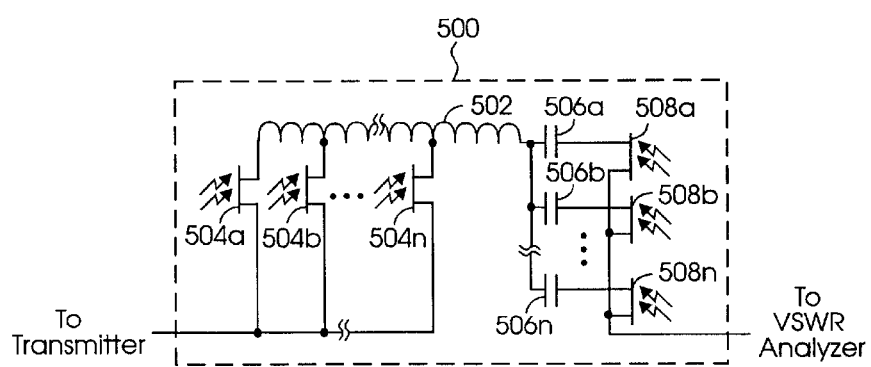
FIG. 5 is a detailed component diagram of one embodiment of the matching network of FIG. 4.

FIG. 5 is a detailed component diagram of one embodiment of the matching network of FIG. 4. These components can be used to form each respective adaptive impedance matching section 402a–402n of $Z_T$ and 404a–404n of $Z_R$.

Impedance matching network 500 of FIG. 5 is comprised of a tapped inductive reactance component 502 coupled in series with a set of capacitive reactance components 506a–506n that are switched in and out in parallel to adapt and match the output of the attached transmitter to the transmission line. During modem operation, inductive reactance is increased or decreased by respectively switching in and out sections of tapped inductor 502 with a plurality of optically coupled FET switches 504a–504n. While optically coupled FET switches are described for this application, mechanical relays or the like may also be implemented. Control of the optically coupled FET switches is accomplished in the central office modem 100 by DSP 112 through impedance control 116. Likewise, control of the optically coupled FET switches is accomplished in the customer premises modem 200 by DSP 212 through impedance control 216. Each impedance control 116 and 216 contains the optical driving half of each optically coupled FET switch.

The initial setting for each impedance matching network 126 ($ZC_A$) and network 226 ($ZR_A$) is the characteristic impedance, $Z_0$ of the transmission line and attached devices with all attached telephone sets in the on-hook state. During operation, network 126 ($ZC_A$) and network 226 ($ZR_A$) are adjusted to optimize the efficiency of each respective balanced broadband low impedance driver 102 and 202.

Figure 6:
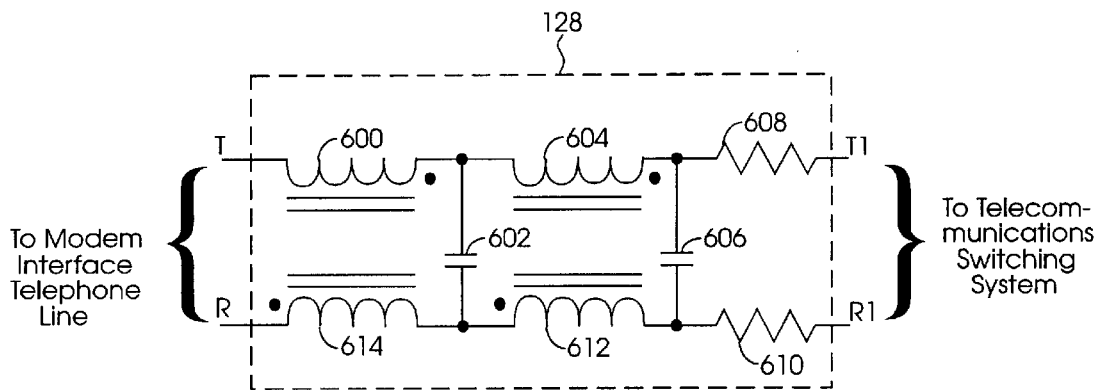
FIG. 6 is a detailed component diagram of one embodiment of the low pass filter of FIG. 1.

FIG. 6 is a detailed component diagram of one embodiment of the low pass filter of FIG. 1. In FIG. 6, an exemplary low pass filter, LPF, section of central office modem 100 is shown. LPF 128 is designed to minimize the effect of the central office voice frequency line matching impedance in the off-hook state. Terminals T1 and R1 are attached to the telecommunications switching system 10 of FIG. 1. Inductive reactance components 600, 604, 612 and 614 are coupled with capacitive reactance components 602 and 606 and resistors 608 and 610, as shown. These devices form a multiple-pole low pass filter capable of passing direct current and ring voltage for operating telephone sets and of passing low frequencies for voice-band communications without adversely affecting high frequency ADSL signals and the like.

Figure 7:
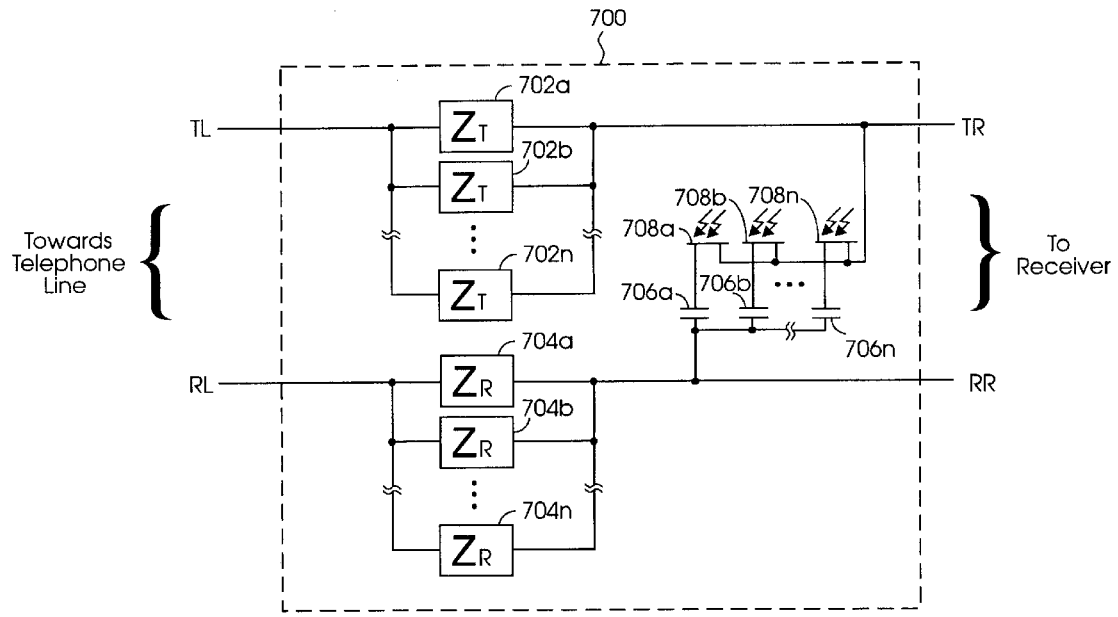
FIG. 7 is a detailed diagram of one embodiment of the receiver section of the adaptive impedance matching device of FIG. 1 and FIG. 2.

FIG. 7 is a detailed diagram of one embodiment of the receiver section of the adaptive impedance matching device of FIG. 1 and FIG. 2. The exemplary adaptive impedance matching section 700 of FIG. 7 details the construction of balanced broadband receiver adaptive impedance matching network 124 ($ZC_B$) of FIG. 1 and network 224 ($ZR_B$) of FIG. 2. Adaptive impedance matching network 124 ($ZC_B$) is adjusted corresponding to VSWR information received from the customer premises modem 200. In a like manner, adaptive impedance matching network 224 ($ZR_B$) is adjusted corresponding to VSWR information received from the central office modem 100.

As shown in FIG. 7, impedance matching sections 702a–702n of $Z_T$ and sections 704a–704n of $Z_R$ are complimentary and are adjusted in unison to form a balanced impedance matching network. Further, the plurality of complimentary sections 702a–702n of $Z_T$ and sections 704a–704n of $Z_R$ are each tuned for impedance matching in a plurality of frequency bands such that the combined set of adaptive impedance matching sections can properly match a very wide frequency range or a plurality of segregated frequency ranges.

Figure 8:
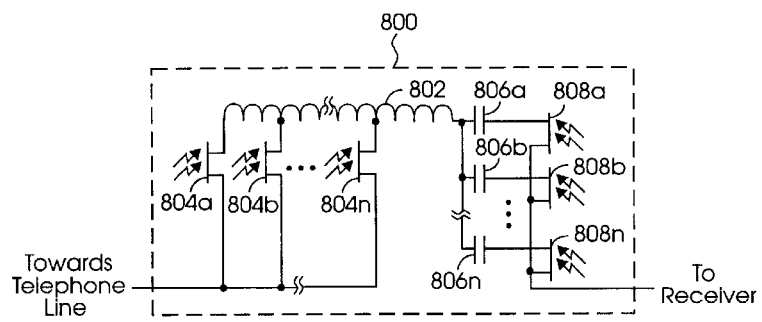
FIG. 8 is a detailed component diagram of one embodiment of the impedance matching network sections of FIG. 7.

FIG. 8 is a detailed component diagram of one embodiment of the impedance matching network sections of FIG. 7. FIG. 8 shows an exemplary adaptive impedance matching network 800 representative of the sections 702a–702n of $Z_T$ and 704a–704n of $Z_R$. During operation, impedance matching is accomplished by switching in and out sections of tapped inductor 802. Each segment of the inductor 802 provides additional inductive reactance for matching the impedance of the transmission line and load. Capacitors 806a–806n provide capacitive reactance that can be switched in or out during operation using optically coupled FETs 808a–808n. The optically coupled drivers for the optically coupled FETs 808a–808n are located in the respective impedance controls 116 and 216 connected to the respective DSP 112 and 212 of each modem 100 and 200.

Figure 9:
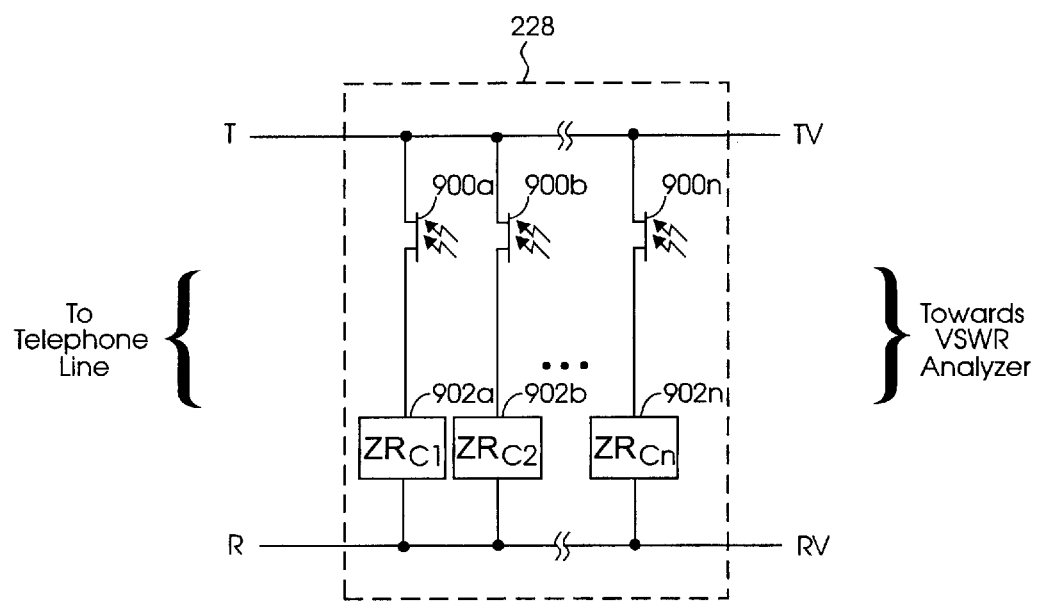
FIG. 9 is a detailed diagram of one embodiment of the bulk impedance matching section of the adaptive impedance matching device.

FIG. 9 is a detailed diagram of one embodiment of the bulk impedance matching section of the adaptive impedance matching device. In FIG. 9 the network 228 is designed to offset large impedance mismatches that occur as telephone sets are taken off-hook at the customer premises. Impedance matching sections 902a–902n of $ZR_C$ are added to the line and removed from the line using optically coupled FET switches 900a–900n. The optically coupled drivers for the optically coupled FETs 900a–900n are located in the respective impedance controls 116 and 216 connected to the respective DSP 112 and 212 of each modem 100 and 200.

Figure 10:
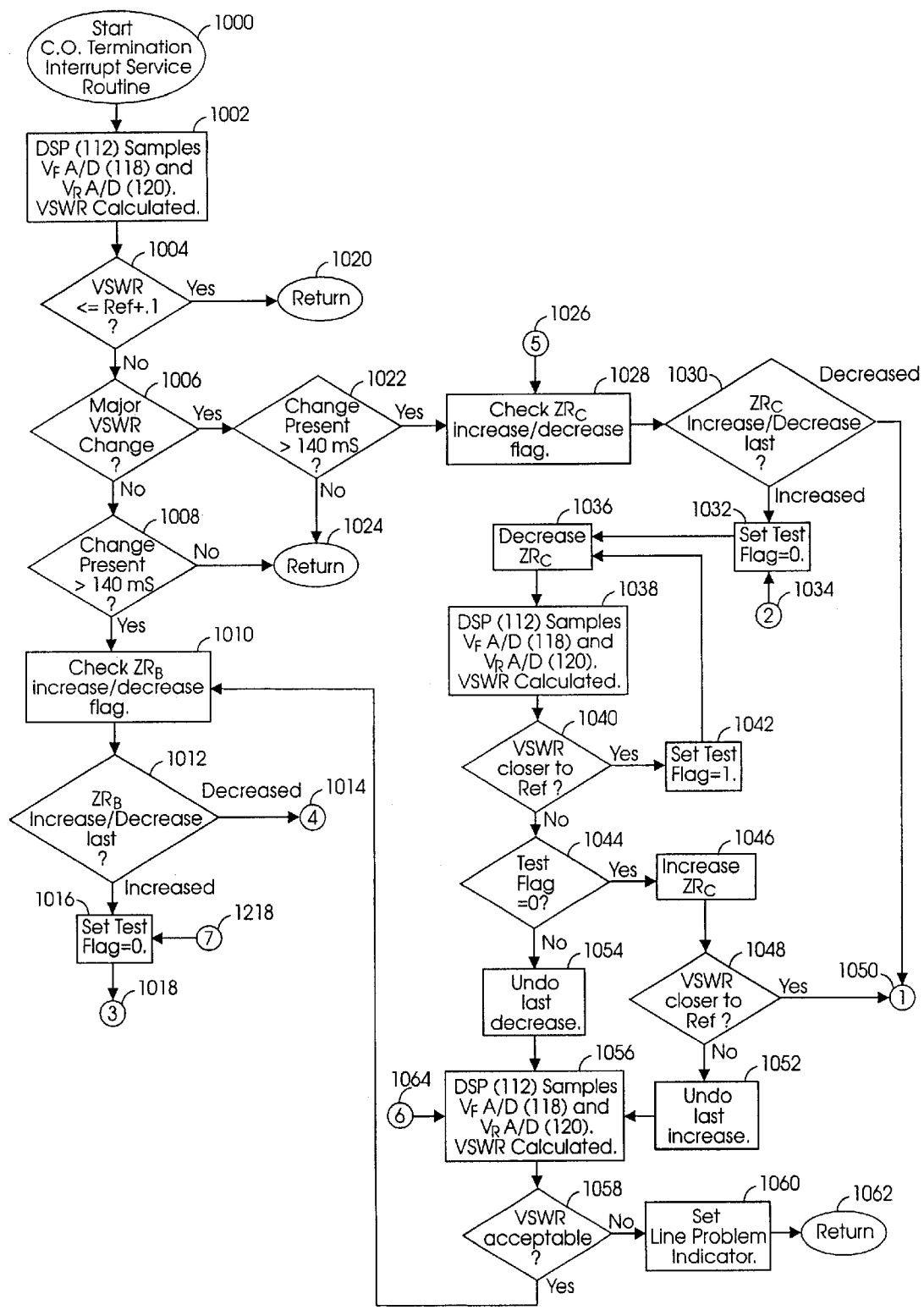
FIGS. 10, 11 and 12 are flow charts of one embodiment of a method for adaptive impedance matching of termination impedances located in customer premises equipment that terminate the line from the telephone company central office.
Figure 11:
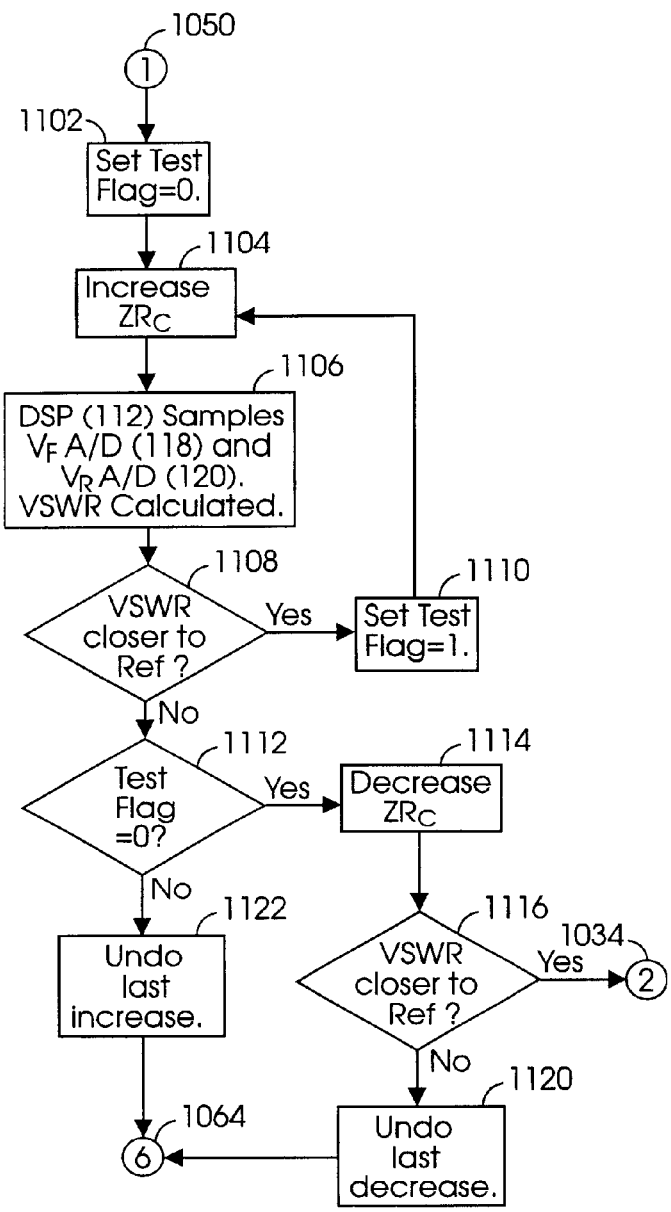
Figure 12:
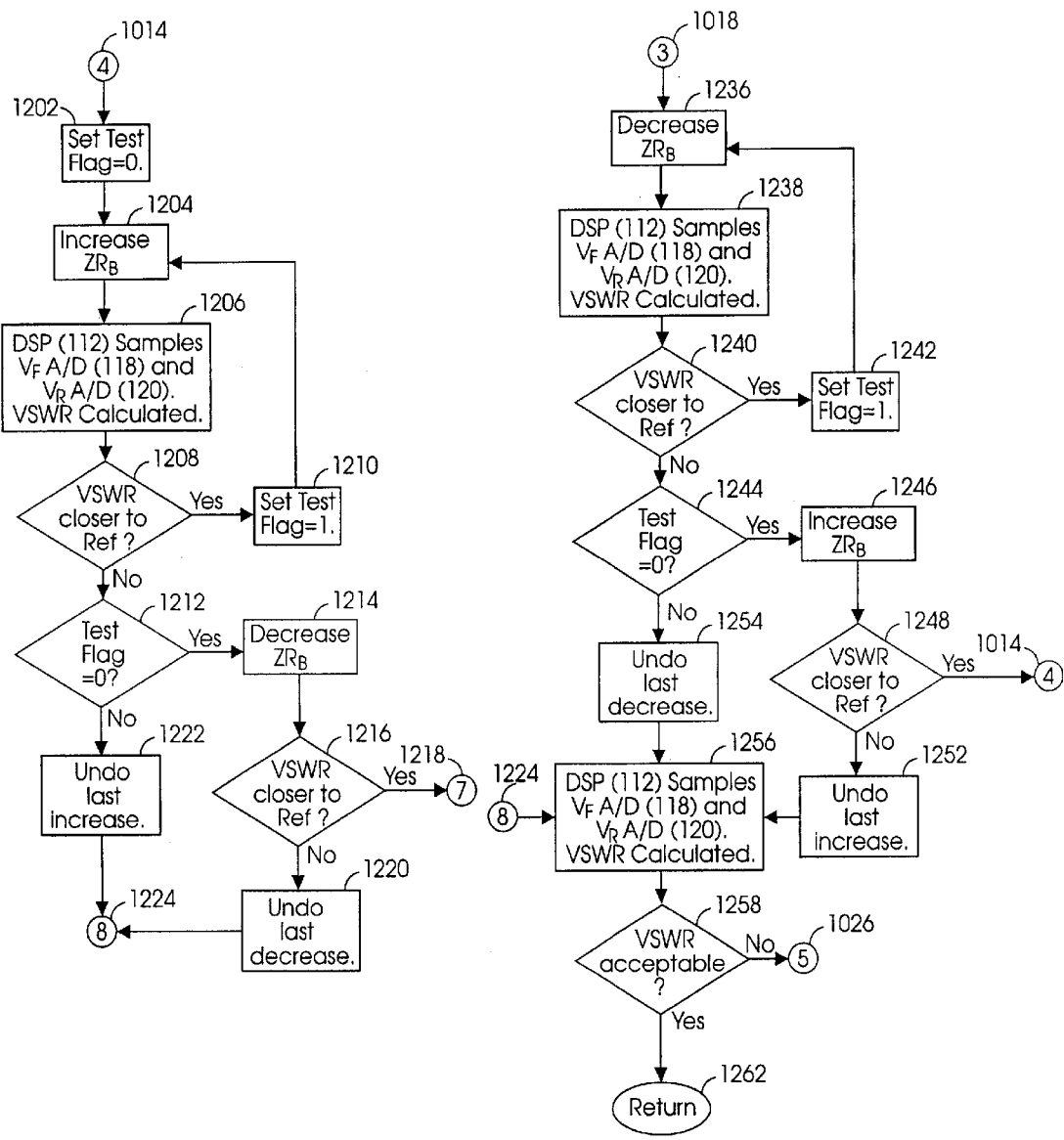

FIGS. 10, 11 and 12 are flow charts of one embodiment of a method for adaptive impedance matching of termination impedances located in customer premises equipment that terminate the line from the telephone company central office. The method of FIGS. 10, 11 and 12 can be implemented, for example, by an interrupt service routine for modem 200 of FIG. 2 to control the $ZR_B$ and $ZR_C$ impedances.

Referring to FIG. 10, in step 1000, the central office termination interrupt service routine is started. Then, in step 1002, the DSP 212 samples $V_F$ A/D 218 and $V_R$ A/D 220 and calculates the VSWR. In step 1004, the DSP 212 determines whether the VSWR is less than or equal to the reference plus 0.1. If so, then the DSP 212 returns from the interrupt service routine in step 1020.

If the VSWR is greater than the reference plus 0.1, then, in step 1006, the DSP 212 determines whether there has been a major VSWR change. If not, then the DSP 212 determines, in step 1008, whether the change is present for greater than 140 milliseconds. If not, then the DSP 212 returns from the interrupt service routine in step 1024. If so, then in step 1010, the DSP 212 checks the $ZR_B$ increase/decrease flag. In step 1012, the DSP 212 determines whether the $ZR_B$ was last increased or decreased based upon the setting of the flag. If the last change was a decrease, then the DSP 212 moves to FIG. 12 as indicated by the label (4). If the last change was an increase, then the DSP 212 sets the test flag equal to "0" in step 1016 and moves to FIG. 12 as indicated by label (3).

It should be understood that this adjustment of the impedance match is representative of the process used. However, for brevity and in order to further clarify the flowchart description, general impedance adjustment is shown. The implemented process can actually involve separate iterative adjustment of the capacitive reactance and inductive reactance components. In such iterative adjustments, in general, the capacitive reactance and inductive reactance are each set to nominal values. Next, the inductive reactance is adjusted to find a best match. Afterwards, the capacitive reactance is adjusted to find a best match. Once the capacitive reactance is adjusted, the inductive reactance is again iteratively adjusted. Again, the same process occurs for the capacitive reactance and so on until a reasonable overall impedance match is found. Of course, other implementations are also possible to achieve the impedance matching adjustments.

Returning to step 1006, if there was a major VSWR change, then the DSP 212 determines, in step 1022, whether the change is present for more than 140 milliseconds. If not, then the DSP 212 returns from the interrupt service routine in step 1024. If the change is present for more than 140 milliseconds, then the DSP 212 moves to step 1028 and checks the $ZR_C$ increase/decrease flag. Then, in step 1030, the DSP 212 determines whether the $ZR_C$ was last increased or decreased based upon the setting of the flag. If the last change was a decrease, then the DSP 212 moves to FIG. 11 as indicated by the label (1). If the last change was an increase, then the DSP 212 sets the test flag equal to "0."

After step 1032, the DSP 212 decreases the $ZR_C$ in step 1036. Then, in step 1038, the DSP 212 samples $V_F$ A/D 218 and $V_R$ A/D 220 and calculates the VSWR. Using this calculation, in step 1040, the DSP 212 determines whether the VSWR is closer to the reference after the change. If so, in step 1042, the DSP 212 sets the test flag to "1" and returns to step 1036. If not, the DSP 212 determines whether the test flag is set "0" in step 1044. If so, then the DSP 212 increases $ZR_C$ in step 1046 and determines, in step 1048, whether the VSWR is closer to the reference. If so, then the DSP 212 moves to FIG. 11 as indicated by label (1).

After either step 1044, if the test flag is not equal to "0," or step 1048, if the VSWR is not closer to the reference, then the DSP 212 respectively undoes the last change in step 1054 (decrease) or in step 1052 (increase). Then, in step 1056, the DSP 212 again samples $V_F$ A/D 218 and $V_R$ A/D 220 and calculates the VSWR. Using the calculation, in step 1058, the DSP 212 determines whether the VSWR is acceptable. If so, the DSP 212 moves to step 1010. If the VSWR is not acceptable, then, in step 1060, the DSP 212 sets a line problem indicator and returns from the interrupt service routine in step 1062. Thus, in this case, the line problem indicator indicates an inability to match bulk impedance. As is discussed below and should be apparent, other line problem indicators can indicate an inability to match receiver impedance or transmitter impedance. Further, line indicators can be set that indicate a matched receiver impedance or transmitter impedance.

Referring to FIG. 11, label (1) indicates a move from FIG. 10 after step 1048 or step 1030. At label (1), the DSP 212 next sets the test flag to equal "0" in step 1102. Then, in step 1104, the DSP 212 increases $ZR_C$. In step 1106, the DSP 212 samples $V_F$ A/D 218 and $V_R$ A/D 220 and calculates the VSWR. Using this calculation, in step 1108, the DSP 212 determines whether the VSWR is closer to the reference after the change. If so, in step 1110, the DSP 212 sets the test flag to "1" and returns to step 1104. If not, the DSP 212 determines whether the test flag is set "0" in step 1112. If so, then the DSP 212 decreases $ZR_C$ in step 1114 and determines, in step 1116, whether the VSWR is closer to the reference. If so, then the DSP 212 moves to FIG. 10 as indicated by label (2). After either step 1112, if the test flag is not equal to "0," or step 1116, if the VSWR is not closer to the reference, then the DSP 212 respectively undoes the last change in step 1122 (increase) or in step 1120 (decrease). The DSP 212 then returns to FIG. 10 as indicate by label (6).

Referring to FIG. 12, label (4) indicates a move from FIG. 10 after step 1012. At label (4), the DSP 212 next sets the test flag to equal "0" in step 1202. Then, in step 1204, the DSP 212 increases $ZR_B$. In step 1206, the DSP 212 samples $V_F$ A/D 218 and $V_R$ A/D 220 and calculates the VSWR. Using this calculation, in step 1208, the DSP 212 determines whether the VSWR is closer to the reference after the change. If so, in step 1210, the DSP 212 sets the test flag to "1" and returns to step 1204. If not, the DSP 212 determines whether the test flag is set "0" in step 1212. If so, then the DSP 212 decreases $ZR_B$ in step 1214 and determines, in step 1216, whether the VSWR is closer to the reference. If so, then the DSP 212 moves to FIG. 10 as indicated by label (7).

After either step 1212, if the test flag is not equal to "0," or step 1216, if the VSWR is not closer to the reference, then the DSP 212 respectively undoes the last change in step 1222 (increase) or in step 1220 (decrease). The DSP 212 then moves to step 1264 as indicated by label (8).

Referring to label (3) in FIG. 12, step 1236 follows step 1016 in FIG. 10. In step 1236, the DSP 212 decreases the $ZR_B$. Then, in step 1238, the DSP 212 samples $V_F$ A/D 218 and $V_R$ A/D 220 and calculates the VSWR. Using this calculation, in step 1240, the DSP 212 determines whether the VSWR is closer to the reference after the change. If so, in step 1242, the DSP 212 sets the test flag to "1" and returns to step 1236. If not, the DSP 212 determines whether the test flag is set "0" in step 1244. If so, then the DSP 212 increases $ZR_B$ in step 1246 and determines, in step 1248, whether the VSWR is closer to the reference. If so, then the DSP 212 moves to step 1202 as indicated by label (4).

After either step 1244, if the test flag is not equal to "0," or step 1248, if the VSWR is not closer to the reference, then the DSP 212 respectively undoes the last change in step 1254 (decrease) or in step 1252 (increase). Then, in step 1256, the DSP 212 again samples $V_F$ A/D 218 and $V_R$ A/D 220 and calculates the VSWR. Using the calculation, in step 1258, the DSP 212 determines whether the VSWR is acceptable. If so, the DSP 212 returns from the interrupt service routine in step 1262. If the VSWR is not acceptable, then, in step 1026, the DSP 212 moves to FIG. 10 as indicated by label (5).

Figure 13:
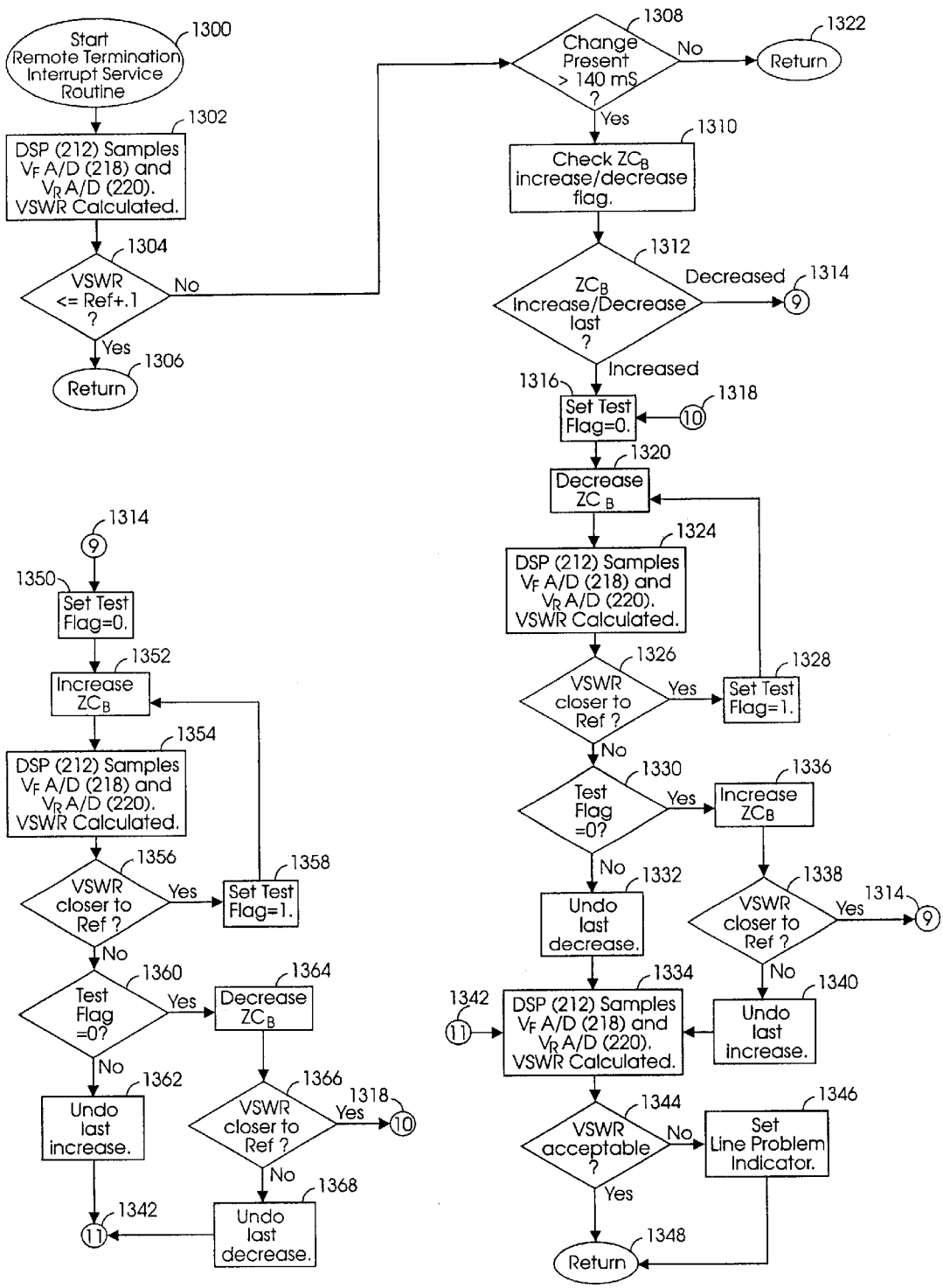
FIG. 13 is a flow chart of one embodiment of a method for adaptive impedance matching of termination impedance located in the telephone company central office that terminate the line from customer premises equipment.

FIG. 13 is a flow chart of one embodiment of a method for adaptive impedance matching of termination impedance located in the telephone company central office that terminate the line from customer premises equipment. The method of FIG. 13 can be implemented, for example, by an interrupt service routine for modem 100 of FIG. 2 to control the $ZC_B$ impedance. In step 1300 of FIG. 13, the remote termination interrupt service routine is started. Then, in step 1302, the DSP 112 samples $V_F$ A/D 118 and $V_R$ A/D 120 and calculates the VSWR. In step 1304, the DSP 112 determines whether the VSWR is less than or equal to the reference plus 0.1. If so, then the DSP 112 returns from the interrupt service routine in step 1306.

If the VSWR is greater than the reference plus 0.1, then, in step 1308, the DSP 112 determines whether the change is present for greater than 140 milliseconds. If not, then the DSP 112 returns from the interrupt service routine in step 1322. If so, then in step 1310, the DSP 112 checks the $ZC_B$ increase/decrease flag. In step 1312, the DSP 112 determines whether the $ZC_B$, was last increased or decreased based upon the setting of the flag. If the last change was a decrease, then the DSP 112 moves to step 1350 of FIG. 13 as indicated by the label (9). If the last change was an increase, then the DSP 112 sets the test flag equal to "0" in step 1316.

After step 1316, the DSP 112 decreases the $ZC_B$ in step 1320. Then, in step 1324, the DSP 112 samples $V_F$ A/D 118 and $V_R$ A/D 120 and calculates the VSWR. Using this calculation, in step 1326, the DSP 112 determines whether the VSWR is closer to the reference after the change. If so, in step 1328, the DSP 112 sets the test flag to "1" and returns to step 1320. If not, the DSP 112 determines whether the test flag is set "0" in step 1330. If it is set to "0", then the DSP 112 increases $ZC_B$ in step 1328 and determines, in step 1338, whether the VSWR is closer to the reference. If so, then the DSP 112 moves to step 1350 of FIG. 13 as indicated by label (9).

After either step 1330, if the test flag is not equal to "0," or step 1338, if the VSWR is not closer to the reference, then the DSP 112 respectively undoes the last change in step 1332

(decrease) or in step 1340 (increase). Then, in step 1334, the DSP 112 again samples $V_F$ A/D 218 and $V_R$ A/D 220 and calculates the VSWR. Using the calculation, in step 1344, the DSP 112 determines whether the VSWR is acceptable. If so, the DSP 112 returns from the interrupt service routine in step 1348. If the VSWR is not acceptable, then, in step 1346, the DSP 112 sets a line problem indicator and returns from the interrupt service routine in step 1348.

Referring to label (9) in FIG. 13, the DSP 112 next sets the test flag to equal "0" in step 1350. Then, in step 1352, the DSP 112 increases $ZC_B$. In step 1354, the DSP 112 samples $_FA/D$ 118 and $V_R$ A/D 120 and calculates the VSWR. Using this calculation, in step 1356, the DSP 112 determines whether the VSWR is closer to the reference after the change. If so, in step 1358, the DSP 112 sets the test flag to "1" and returns to step 1352. If not, the DSP 112 determines whether the test flag is set "0" in step 1360. If so, then the DSP 112 decreases $ZC_B$ in step 1364 and determines, in step 1366, whether the VSWR is closer to the reference. If so, then the DSP 112 moves to step 1316 of FIG. 13 as indicated by label (10). After either step 1360, if the test flag is not equal to "0," or step 1366, if the VSWR is not closer to the reference, then the DSP 112 respectively undoes the last change in step 1362 (increase) or in step 1368 (decrease). The DSP 112 then returns to step 1342 of FIG. 13 as indicated by label (11).

Figure 14:
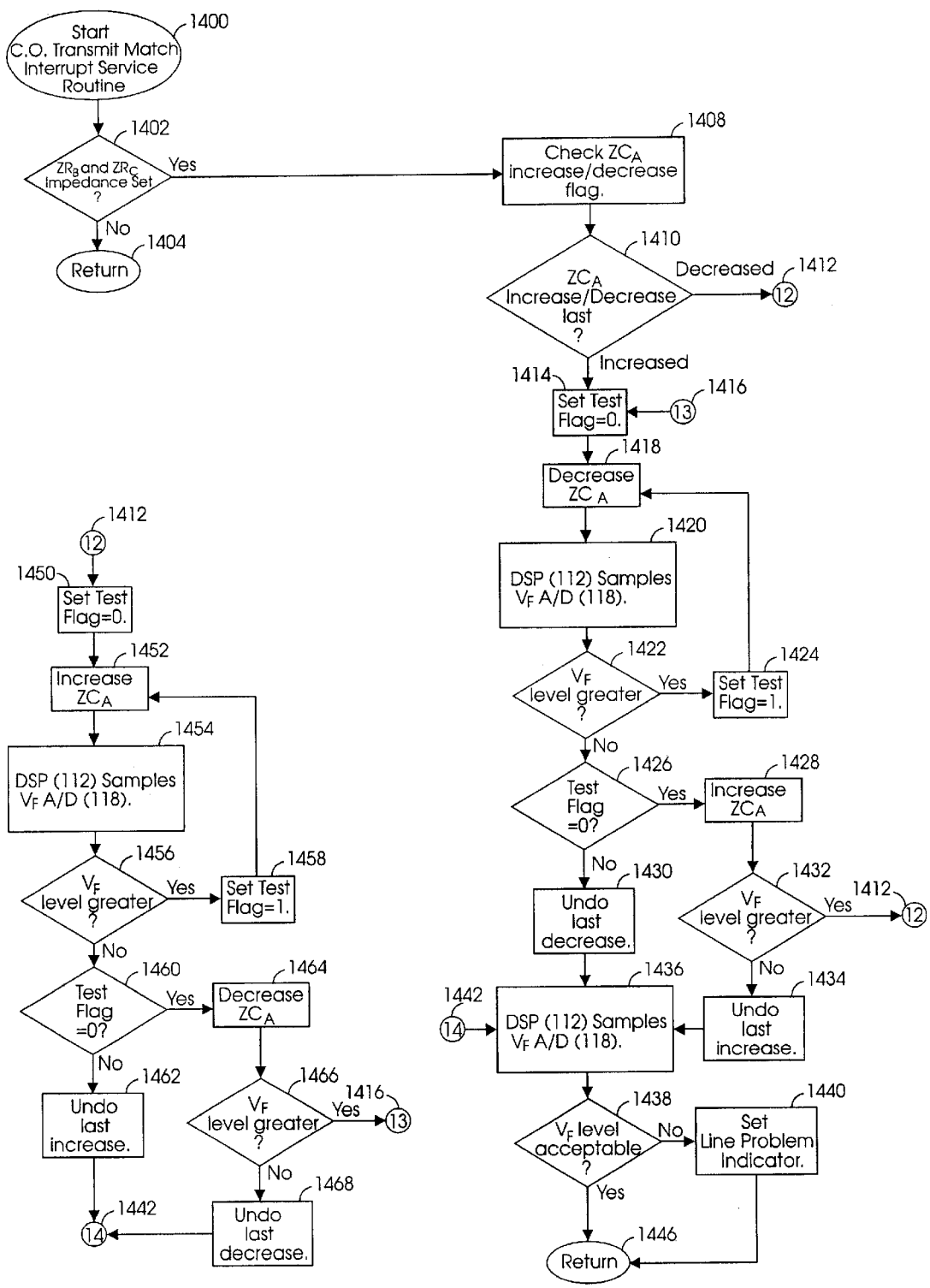
FIG. 14 is a flow chart of one embodiment of a method for adaptive impedance matching of termination impedance located in the telephone company central office for a device transmitting from customer premises equipment.

FIG. 14 is a flow chart of one embodiment of a method for adaptive impedance matching of termination impedance located in the telephone company central office for a device transmitting from customer premises equipment. The method of FIG. 14 can be implemented, for example, by an interrupt service routine for modem 100 of FIG. 2 to control the $ZC_A$ impedance. In step 1400 of FIG. 14, the central office transmit match interrupt service routine is started. Then, in step 1402, the DSP 212 determines whether the $ZR_B$ and $ZR_C$ impedances have been set. If not, the DSP 112 returns from the interrupt service routine in step 1404. If the impedances are set, then the DSP 112, in step 1408, checks the $ZC_A$ increase/decrease flag. In step 1410, the DSP 112 determines whether the $ZC_A$ was last increased or decreased based upon the setting of the flag. If the last change was a decrease, then the DSP 112 moves to step 1450 of FIG. 14 as indicated by the label (12). If the last change was an increase, then the DSP 112 sets the test flag equal to "0" in step 1414.

After step 1414, the DSP 112 decreases the $ZC_A$ in step 1418. Then, in step 1420, the DSP 112 samples $V_F$ A/D 118. In step 1422, the DSP 112 determines whether the $V_F$ is greater. If so, in step 1424, the DSP 112 sets the test flag to "1" and returns to step 1418. If not, the DSP 112 determines whether the test flag is set "0" in step 1426. If it is set to "0", then the DSP 112 increases $ZC_A$ in step 1428 and determines, in step 1432, whether the $V_F$ level is greater. If so, then the DSP 112 moves to step 1450 of FIG. 14 as indicated by label (12).

After either step 1426, if the test flag is not equal to "0," or step 1432, if the $V_F$ is not greater, then the DSP 112 respectively undoes the last change in step 1430 (decrease) or in step 1434 (increase). Then, in step 1436, the DSP 112 again samples $V_F$ A/D 118. In step 1438, the DSP 112 determines whether the $V_F$ level is acceptable. If so, the DSP 112 returns from the interrupt service routine in step 1446. If the $V_F$ is not acceptable, then, in step 1440, the DSP 112 sets a line problem indicator and returns from the interrupt service routine in step 1446.

Referring to label (12) in FIG. 14, the DSP 112 next sets the test flag to equal "0" in step 1450. Then, in step 1452, the DSP 112 increases $ZC_A$. In step 1454, the DSP 112 samples $V_F$ A/D 118. In step 1456, the DSP 112 determines whether the $V_F$ level is greater. If so, in step 1458, the DSP 112 sets the test flag to "1" and returns to step 1452. If not, the DSP 112 determines whether the test flag is set "0" in step 1460. If so, then the DSP 112 decreases $ZC_A$ in step 1464 and determines, in step 1466, whether the $V_F$ level is greater. If it is, then the DSP 112 moves to step 1414 of FIG. 14 as indicated by label (13). After either step 1460, if the test flag is not equal to "0," or step 1466, if the $V_F$, level is not greater, then the DSP 112 respectively undoes the last change in step 1462 (increase) or in step 1468 (decrease). The DSP 112 then returns to step 1436 of FIG. 14 as indicated by label (14).

Figure 15:
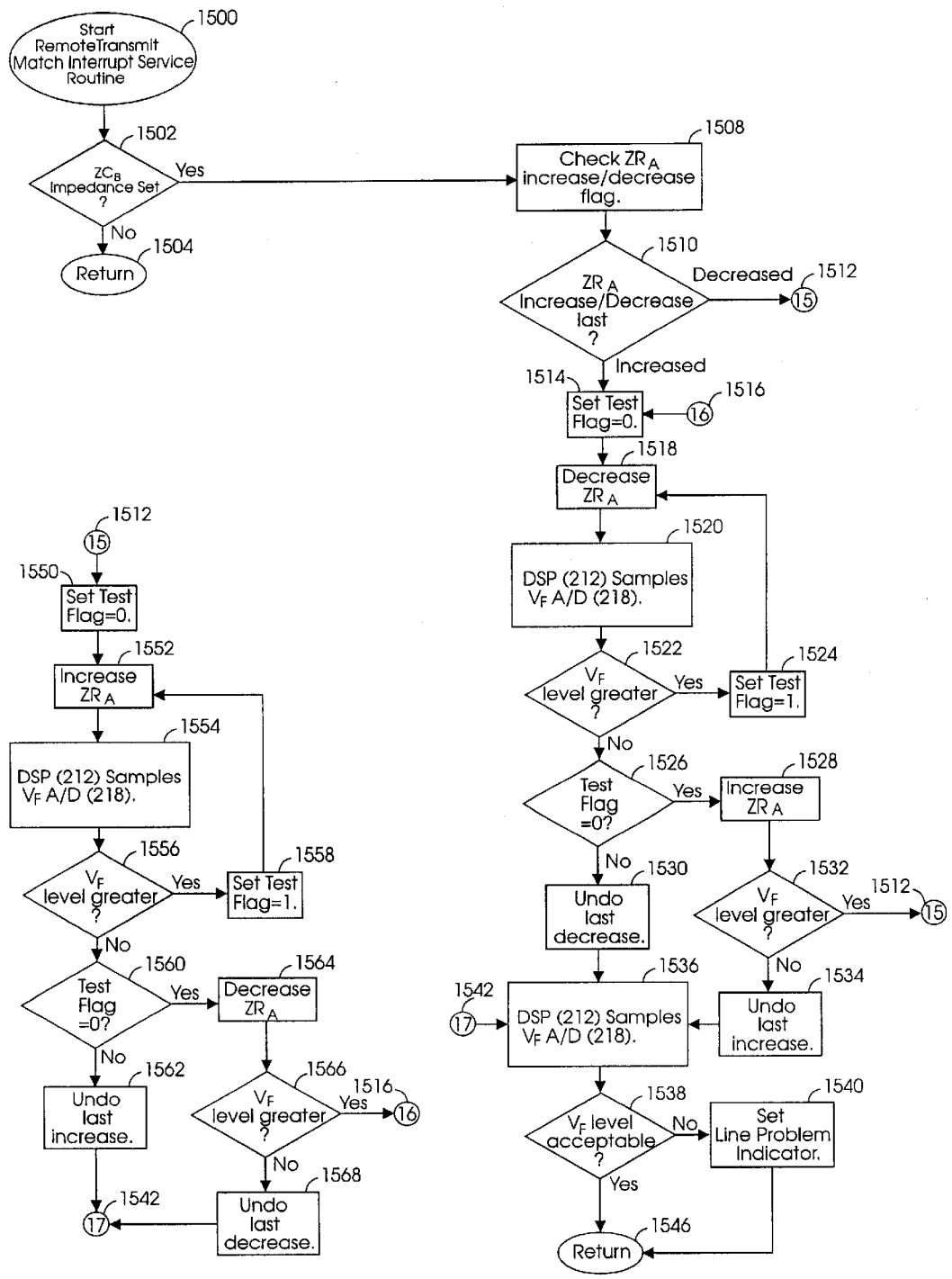
FIG. 15 is a flow chart of one embodiment of a method for adaptive impedance matching of termination impedance located in customer premises equipment for a device transmitting from the telephone company central office.

FIG. 15 is a flow chart of one embodiment of a method for adaptive impedance matching of termination impedance located in customer premises equipment for a device transmitting from the telephone company central office. The method of FIG. 15 can be implemented, for example, by an interrupt service routine for modem 200 of FIG. 2 to control the $ZR_A$ impedance. In step 1500 of FIG. 15, the remote transmit match interrupt service routine is started. Then, in step 1502, the DSP 212 determines whether the $ZC_B$ impedances has been set. If not, the DSP 212 returns from the interrupt service routine in step 1504. If the impedance is set, then the DSP 212, in step 1508, checks the ZR, increase/decrease flag. In step 1510, the DSP 212 determines whether the $ZR_A$ was last increased or decreased based upon the setting of the flag. If the last change was a decrease, then the DSP 212 moves to step 1550 of FIG. 15 as indicated by the label (15). If the last change was an increase, then the DSP 212 sets the test flag equal to "0" in step 1514.

After step 1514, the DSP 212 decreases the $ZR_A$ in step 1518. Then, in step 1520, the DSP 212 samples $V_F$ A/D 218. In step 1522, the DSP 212 determines whether the $V_F$ is greater. If so, in step 1524, the DSP 212 sets the test flag to "1" and returns to step 1518. If not, the DSP 212 determines whether the test flag is set "0" in step 1526. If it is set to "0", then the DSP 212 increases $ZR_A$ in step 1528 and determines, in step 1532, whether the $V_F$ level is greater. If so, then the DSP 212 moves to step 1550 of FIG. 15 as indicated by label (15).

After either step 1526, if the test flag is not equal to "0," or step 1532, if the $V_F$ is not greater, then the DSP 212 respectively undoes the last change in step 1530 (decrease) or in step 1534 (increase). Then, in step 1536, the DSP 212 again samples $V_F$ A/D 218. In step 1538, the DSP 212 determines whether the $V_F$ level is acceptable. If so, the DSP 212 returns from the interrupt service routine in step 1546. If the $V_F$ is not acceptable, then, in step 1540, the DSP 212 sets a line problem indicator and returns from the interrupt service routine in step 1546.

Referring to label (15) in FIG. 15, the DSP 212 next sets the test flag to equal "0" in step 1550. Then, in step 1552, the DSP 212 increases $ZR_A$. In step 1554, the DSP 212 samples $V_F$ A/D 218. In step 1556, the DSP 212 determines whether the $V_F$ level is greater. If so, in step 1558, the DSP 212 sets the test flag to "1" and returns to step 1552. If not, the DSP 212 determines whether the test flag is set "0" in step 1560. If so, then the DSP 212 decreases $ZR_A$ in step 1564 and determines, in step 1566, whether the $V_F$ level is greater. If it is, then the DSP 212 moves to step 1514 of FIG. 15 as indicated by label (16). After either step 1560, if the test flag is not equal to "0," or step 1566, if the $V_F$ level is not greater, then the DSP 212 respectively undoes the last change in step 1562 (increase) or in step 1568 (decrease). The DSP 212 then returns to step 1536 of FIG. 15 as indicated by label (17).

It should be understood that the foregoing description is merely illustrative of an impedance matching device as used in an ADSL environment. The technology may also be adapted to other network applications, such as in a home telephone networking environment utilizing high frequency transmissions between one or more sources and one or more receivers. Additionally, many other benefits may be obtained by applying the technology in a different manner or in other embodiments.

Further, it should be understood that the impedance matching can be implemented in a number of alternate ways consistent with the present invention. For example, the transmitter can communicate with the receiver to adjust and match impedances. Also, there can be a predetermined load adjustment or an adaptive load adjustment. Thus, both transmitter/receiver and load adjustment can be implemented or load adjustment only. In addition, the impedance matching can be sensitive to frequency spectrums such that matching in one portion of the spectrum does not adversely affect other portions of the spectrum. The device can have an ability to scan the frequency spectrum and optimally match a plurality of signal transform impedance matching networks. Further, devices can be implemented, for example, that provide adaptive impedance matching at base-band voice frequencies, at xDSL frequencies and/or home phone line networking frequencies. Matching can also be accomplished over a broad spectrum or over a broad spectrum having a plurality of subset frequency bands which may or may not be contiguous.

In summary, as discussed above, adaptive and continual adjustment of the transmission line termination impedance or source impedance combined with termination impedance is imperative to maintaining the highest possible information or data transmission rate, especially when the transmission line is a telephone line having multiple telephone sets which may be taken off-hook in any sequence at random and the information or data signal transmission methodology uses high frequencies for transport. Continual optimization of the termination impedance also counters environmental effects on the transmission line. Environmental changes such as temperature, will vary the length of the transmission line and, therefore, will vary the electrical characteristics of the transmission line. Thus, the present device and method for providing continual adjustment of the termination impedance or combined source and termination impedances have applicability in a variety of broadband transmission applications including, but not limited to, xDSL and home phone line networking.

Although the present invention has been described in detail, it should be understood that various changes, substitutions and alterations can be made hereto without departing from the spirit and scope of the invention as defined by the appended claims.

What is claimed is:

1. An adaptive impedance matching device, comprising:
    a signal transmission section;
    a signal receiving section operable to receive signal information transmitted across a transmission line, the signal information including phase information for each of a plurality of transmitted signals in a frequency range and standing wave ratio information transmitted by equipment located at an opposite end of the transmission line;
    a variable impedance matching network; and
    a signal analysis section operable to calculate a proper impedance match based upon the signal information, the signal analysis section further operable to continuously adjust the variable impedance matching network according to the calculated impedance match.

2. The device of claim 1, wherein the signal information originates at a predefined level and is transmitted with a predefined frequency spectrum, and the signal analysis section analyzes physical effects on the signal information that has traversed the transmission line using the predefined level and frequency spectrum.

3. The device of claim 1, wherein the signal information comprises forward voltage information.

4. The device of claim 1, wherein the signal information comprises reflected voltage information.

5. The device of claim 1, wherein the signal analysis section comprises discrete electronic components organized in a design specifically for providing control of the variable impedance matching networks.

6. The device of claim 1, wherein the signal analysis section comprises an interface circuit and a software algorithm residing on a control processing devices which control the variable impedance matching networks.

7. The device of claim 6, wherein the control processing device comprises a digital signal processor (DSP).

8. The device of claim 1, wherein the device is located inside broadband modem equipment.

9. The device of claim 8, wherein the broadband modem equipment is an xDSL modem.

10. The device of claim 8, wherein the broadband modem equipment is a home phone line network device.

11. The device of claim 1, wherein the variable impedance matching network adjusts an impedance of the signal receiving section.

12. The device of claim 1, wherein the variable impedance matching network adjusts an impedance of the signal transmitting section.

13. The device of claim 1, wherein the variable impedance matching network comprises discrete circuitry that determines an impedance matching component value.

14. The device of claim 1, wherein the variable impedance matching network comprises an impedance matching component value determined by a processor in conjunction with a corresponding software process.

15. The device of claim 1, wherein the signal transmission section and the signal receiving section are connected to an xDSL network.

16. The device of claim 1, wherein the signal transmission section and the signal receiving section are connected to a home phone line network.

17. The device of claim 1, wherein the signal transmission section and the signal receiving section are connected to a cable network.

18. The device of claim 1, wherein the signal transmission section and the signal receiving section are connected to a combined telecommunications and data equipment environment, where the data equipment imposes its signals onto a telephone line.

19. The device of claim 1, wherein the signal analysis section is further operable to set a line indicator responsive to the signal information.

20. The device of claim 19, wherein the line indicator indicates an inability to match receiver impedance.

21. The device of claim 19, wherein the line indicator indicates an inability to match transmitter impedance.

22. The device of claim 19, wherein the line indicator indicates a matched receiver impedance.

23. The device of claim 19, wherein the line indicator indicates a matched transmitter impedance.

24. A method for adaptive impedance matching, comprising:

receiving signal information transmitted across a transmission line, the signal information including phase information for each of a plurality of transmitted signals in a frequency range and standing wave ratio information transmitted by equipment located at an opposite end of the transmission line;

calculating a proper impedance match based upon the signal information; and continuously adjusting a variable impedance matching network according to the calculated impedance match.

25. The method of claim 24, wherein the signal information originates at a predefined level and is transmitted with a predefined frequency spectrum, and calculating comprises analyzing physical effects on the signal information that has traversed the transmission line using the predefined level and frequency spectrum.

26. The method of claim 24, wherein the signal information comprises forward voltage information.

27. The method of claim 24, wherein the signal information comprises reflected voltage information.

28. The method of claim 24, wherein the calculating and adjusting are accomplished by discrete electronic components organized in a design specifically for providing control of the variable impedance matching networks.

29. The method of claim 24, wherein the calculating and adjusting are accomplished by an interface circuit and a software algorithm residing on a control processing devices which control the variable impedance matching networks.

30. The method of claim 29, wherein the control processing device comprises a digital signal processor (DSP).

31. The method of claim 24, wherein the method is accomplished by a device located inside broadband modem equipment.

32. The method of claim 31, wherein the broadband modem equipment is an xDSL modem.

33. The method of claim 32, wherein the broadband modem equipment is a home phone line network device.

34. The method of claim 24, wherein the signal transmission occurs across an xDSL network.

35. The method of claim 24, wherein the signal transmission occurs across a home phone line network.

36. The method of claim 24, wherein the signal transmission occurs across a cable network.

37. The method of claim 24, further comprising setting a line indicator responsive to the signal information.

38. The method of claim 37, wherein the line indicator indicates an inability to match receiver impedance.

39. The method of claim 37, wherein the line indicator indicates an inability to match transmitter impedance.

40. The method of claim 37, wherein the line indicator indicates a matched receiver impedance.

41. The method of claim 37, wherein the line indicator indicates a matched transmitter impedance.

* * * * *